(12) United States Patent
Hsiao

(10) Patent No.: US 8,052,305 B2
(45) Date of Patent: Nov. 8, 2011

(54) SOUND-ACTIVATED LIGHT SOURCE SYSTEM

(75) Inventor: Bor-Yuan Hsiao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 615 days.

(21) Appl. No.: 12/257,770

(22) Filed: Oct. 24, 2008

(65) Prior Publication Data

US 2009/0268448 A1    Oct. 29, 2009

(30) Foreign Application Priority Data

Apr. 23, 2008  (CN) .......................... 2008 1 0301269

(51) Int. Cl.
*F21V 33/00* (2006.01)
(52) U.S. Cl. .......................................... 362/253; 362/802
(58) Field of Classification Search .................. 362/235, 362/802
See application file for complete search history.

(56) References Cited

U.S. PATENT DOCUMENTS

2007/0028695 A1 * 2/2007 Suzuki et al. .................... 73/655
2007/0109782 A1 * 5/2007 Wolf et al. ..................... 362/253

* cited by examiner

*Primary Examiner* — Laura Tso
(74) *Attorney, Agent, or Firm* — Altis Law Group, Inc.

(57) ABSTRACT

An exemplary sound-activated light source system includes a light source device and a sound-activated controlling device. The sound-activated controlling device includes an acoustoelectric transforming member and a controlling circuit. The acoustoelectric transforming member includes electroactive polymer artificial muscle for converting an acoustic signal into an electrical signal. The controlling circuit is electrically coupled to the acoustoelectric transforming member and the light source device, and is configured for controlling at least one of brightness and color of light emitting from the light source device based on the electrical signal received from the acoustoelectric transforming member.

17 Claims, 3 Drawing Sheets

SOUND-ACTIVATED LIGHT SOURCE SYSTEM

BACKGROUND

1. Technical Field

The present invention relates to a light source system, and particularly, to a sound-activated light source system.

2. Description of Related Art

Recently, light emitting diodes (LEDs) are increasingly used in various illuminating apparatuses, for example, indoor, outdoor and corridor illuminations, due to extraordinary properties such as a high illumination efficiency and a low energy consumption.

Generally, illumination devices employing LEDs are manually controlled (turn on/off) by switches. However, the LEDs may gradually deteriorate by repeatedly use of switches, to turn on or off the LEDs.

Therefore, a new sound-activated light source system is desired to overcome the above mentioned problems.

SUMMARY

A sound-activated light source system includes a light source device and a sound-activated controlling device. The sound-activated controlling device includes an acoustoelectric transforming member and a controlling circuit. The acoustoelectric transforming member includes electroactive polymer artificial muscle for converting an acoustic signal into an electrical signal. The controlling circuit is electrically coupled to the acoustoelectric transforming member and the light source device, and is configured for controlling at least one of brightness and color of light emitting from the light source device based on the electrical signal received from the acoustoelectric transforming member.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Reference will now be made to the drawings to describe an exemplary embodiment of the sound activated light source system in detail.

Figure 1:
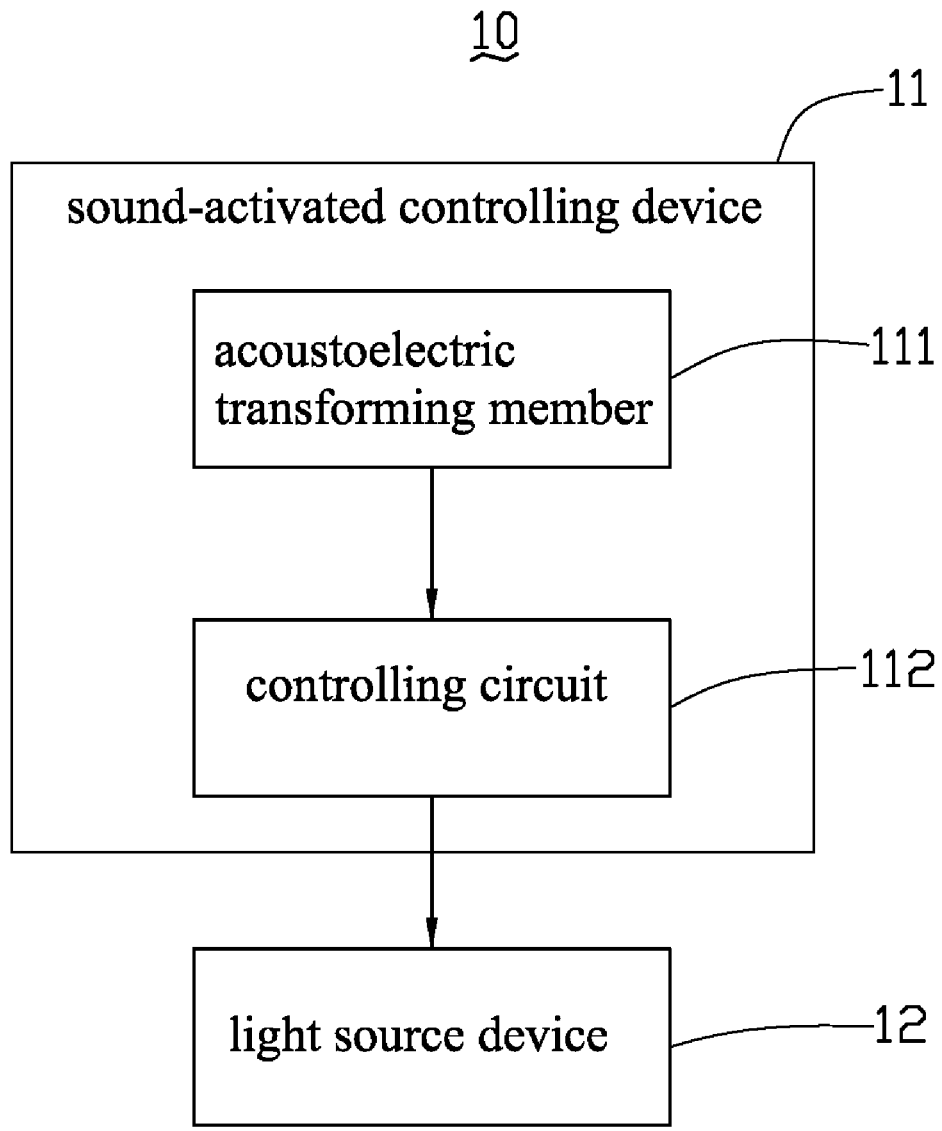
FIG. 1 is a schematic, block diagram of a sound-activated light source system according to an exemplary embodiment.

Referring to FIG. 1, a sound-activated light source system 10 includes a sound-activated controlling device 11 and a light source device 12 electrically coupled to the sound-activated controlling device 11.

The sound-activated controlling device 11 is configured for receiving an acoustic signal and controlling illumination of the light source device 12 based on the acoustic signal. The sound-activated controlling device 11 includes an acoustoelectric transforming member 111 and a controlling circuit 112 electrically coupled to the acoustoelectric transforming member 111. During operation of the sound-activated light source system 10, the acoustoelectric transforming member 111 receives the acoustic signal and converts the acoustic signal into an electrical signal. The controlling circuit 112 controls the light source device 12 to emit light based on the electrical signal.

Figure 2:
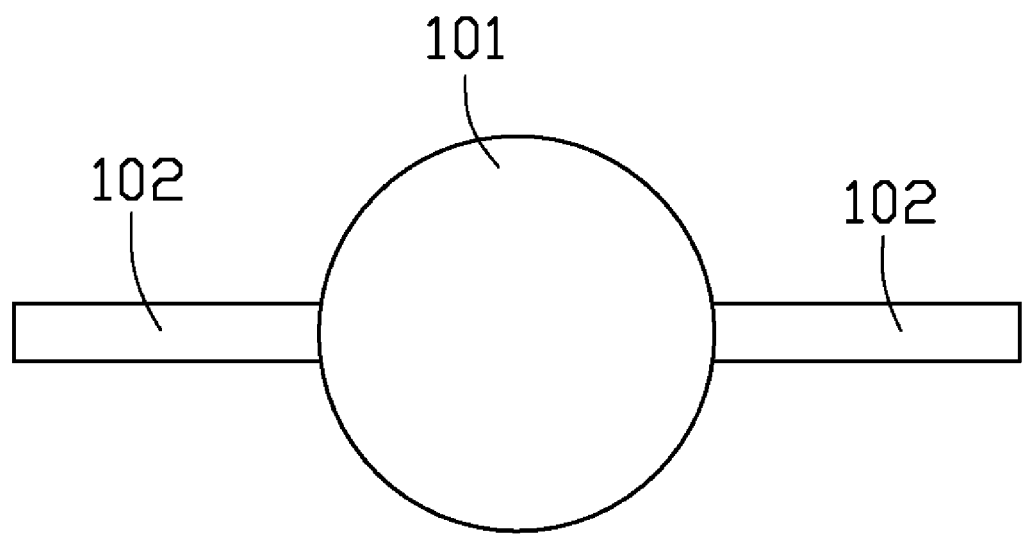
FIG. 2 is a schematic, cross-sectional view of an acoustoelectric transforming member shown in FIG. 1.

Referring to FIG. 2, the acoustoelectric transforming member 111 includes an acoustic receiver 101 and electroactive polymer artificial muscle 102 connected to the acoustic receiver 101. The acoustic receiver 101 facilitates the electroactive polymer artificial muscle 102 to receive the acoustic signal. In detail, firstly, an acoustic signal (sounds) generates an acoustic wave vibration. Secondly, the acoustic receiver 101 receives the acoustic wave vibration generated from the acoustic signal, and is vibrated by the acoustic wave vibration. The vibration of the acoustic receiver 101 drives the electroactive polymer artificial muscle 102 to vibrate, thereby achieving transmitting of the acoustic wave vibration to the electroactive polymer artificial muscle 102. The acoustic receiver 101 may be a film made of a polymer such as a polyethylene terephathalate (PET) film.

In present embodiment, the electroactive polymer artificial muscle 102 is film-shaped. The acoustoelectric transforming member 111 comprises two film-shaped electroactive polymer artificial muscles 102, e.g. the electroactive polymer artificial muscle film 102. Each of the electroactive polymer artificial muscles film 102 is respectively connected to the acoustic receiver 101 and the controlling circuit 112.

In operation, the electroactive polymer artificial muscle film 102 is vibrated and deformed by the vibration of the acoustic receiver 101. The electroactive polymer artificial muscle film 102 then generates an electrical signal corresponding to a degree of the vibration deformation and transmits the electrical signal to the controlling circuit 112. A frequency and amplitude of the electrical signal generated from the electroactive polymer artificial muscle film 102 is respectively in response to a vibration frequency and amplitude of the acoustic wave from the acoustic receiver 101.

Additionally, the electroactive polymer artificial muscle film 102 may consist of a single layer of electroactive polymer artificial muscle or a plurality of layers thereof. The electroactive polymer artificial muscle 102 is configured for both receiving the acoustic signal and converting the acoustic signal into the electric signal. In such case, the acoustic receiver 101 can be omitted. The acoustoelectric transforming member 111 consists of 5 to 10 layers of the electroactive polymer artificial muscle. A thickness of the single layer electroactive polymer artificial muscle film is substantially between 120 micrometers and 150 micrometers. Each layer of the electroactive polymer artificial muscle is connected to the polyethylene terephathalate film 101 and the controlling circuit 112 respectively. As such, the electroactive polymer artificial muscle film can generates a relative strong output electric signal even when the acoustic signal is relative weak.

The controlling circuit 112 is electrically coupled to the acoustoelectric transforming member 111 and the light source device 12, and is configured for controlling the light source device 12 according to the electrical signal received from the acoustoelectric transforming member 111. The controlling circuit 112 controls an output signal (such as a voltage or a current) applied to the light source device 12, thereby controlling a brightness of the light emitted from the light source device 12 based on the amplitude of the electric signal from the acoustoelectric transforming member 111. Meanwhile, the controlling circuit 112 can convert the output signal into a pulse signal such that a flicking frequently of the light source device 12 corresponds to the frequency of the electric signal from the acoustoelectric transforming member 111. The flicking frequency is configured for controlling a light source cycle of the light source device 12.

As a result, the acoustic signal can control the light source device 12 in such a manner of using the controlling circuit 112 as above mentioned. Alternatively, a signal amplification circuit may be employed and coupled to the controlling circuit 112 and the light source device 12 for amplifying the electric signal from the controlling circuit 112 as desired.

The light source device 12 emitting light in response to the controlling circuit 112 can be an illuminating or luminous device. Alternatively, the light source device 12 may include a monochrome or a multi-color lighting component. Examples of monochrome light source device 12 include a single monochrome light emitting member (e.g. light emitting diode), or an array of monochrome light emitting members. The monochrome light emitting members comprises at least one emitting diode for emitting single color light. The multi-color light source device 12 may include one or more lighting emitting groups which includes at least two light emitting members (e.g. light emitting diodes) emitting light having different color.

Figure 3:
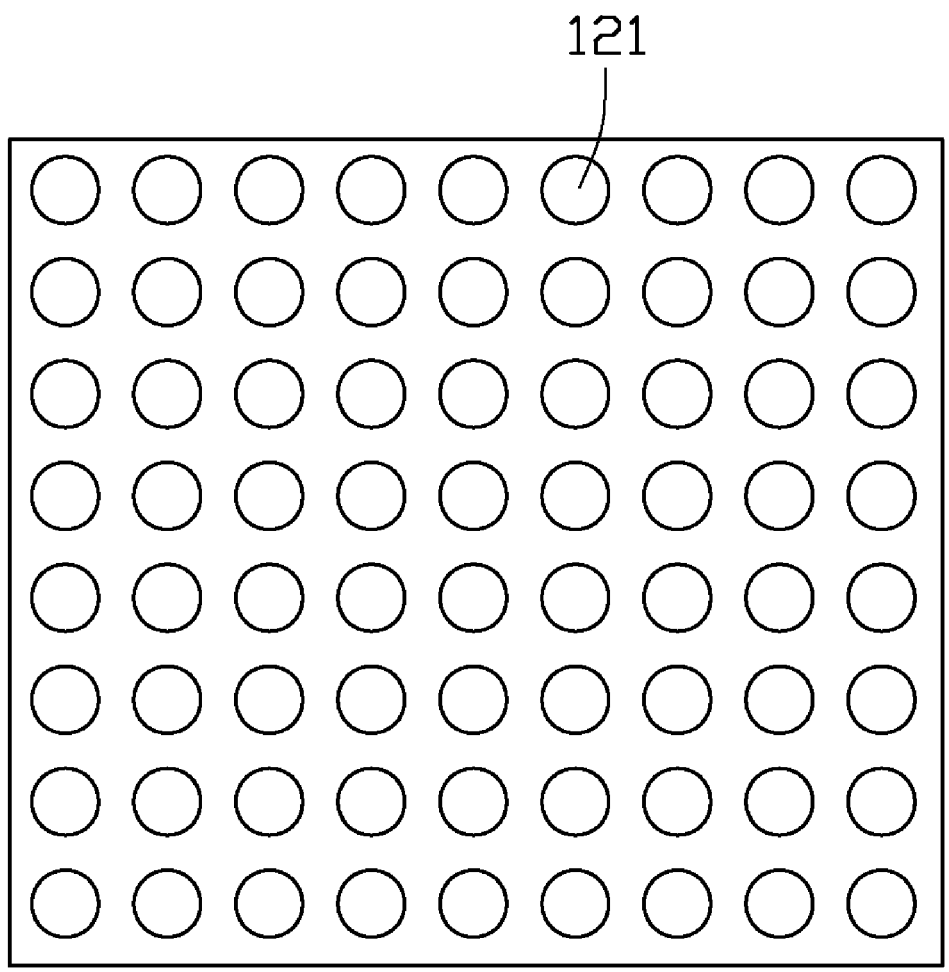
FIG. 3 is a schematic, cross-sectional view of a light source device shown in FIG. 1.

Reference to FIG. 3, for example, the light source device 12 is a monochrome lighting component 12 having an array of monochrome light emitting members 121. The controlling circuit 112 controls each light emitting member 121 to simultaneously emit light, and adjusts both a light source brightness and a light source cycle of each light emitting member 121 according to the acoustoelectric wave, for achieving monochrome light with adjustable brightness.

When the light source device 12 is a multi-color lighting component having a light emitting member array 12. For example, the light emitting member array 12 includes three light emitting members 121 which respectively emit red, green and blue light. The controlling circuit 112 controls the illuminating brightness and illuminating cycle of each color light in a manner that the controlling circuit 112 controls each light emitting member 121 of the light source device 12 to simultaneously light, and adjusts both the illuminating brightness and illuminating cycle of each light emitting member 121 according to the acoustoelectric wave. As a result, red, green and blue light having variable brightness mixes to perform a mixed light and achieving a light with variable colors.

The light emitting member 121 can be a lighting source selected from the group consisting of a light emitting diode (LED), a cold cathode fluorescent lamp, a hot cathode fluorescent lamp and a xenon lamp.

The light source device 12 of the exemplary embodiment is a multi-color LED array 12 which has a LED assembly consisting at least two LEDs 121 for emitting light with different colors, e.g. a mixed light selected from red, green, or blue light source. In operation, the controlling device 112 controls each LED 121 of the multi-color LED array 12 emitting one color light and adjusts a proportion of each color light in accordance to the electrical signal thereby controlling both color and brightness of light emitted from the light emitting diode assembly.

The working principle of the sound-activated light source system 10 is described below. Firstly, the acoustic receiver 101 of the sound-activated controlling device 11 receives an acoustic signal and transmits it to the electroactive polymer artificial muscle 102. Secondly, the electroactive polymer artificial muscle 102 connected to the acoustic receiver 101 converts the acoustic signal from the acoustic receiver 101 into an electric signal, and sends the electric signal to the controlling circuit 112. Thirdly, the controlling circuit 112 generates an output signal corresponding to the electric signal and applies the output signal to the light source device 12 thereby controlling the light source device 12. Therefore, it is achieved that the sound-activated controlling device 11 controls the light source device 12 according to the acoustic signal received.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A sound-activated light source system comprising:
a light source device; and
a sound-activated controlling device comprising an acoustoelectric transforming member and a controlling circuit, the acoustoelectric transforming member being comprised of electroactive polymer artificial muscle for converting an acoustic signal into an electrical signal, the controlling circuit being electrically coupled to the acoustoelectric transforming member and the light source device, and being configured for controlling at least one of brightness and color of light emitted from the light source device based on the electrical signal received from the acoustoelectric transforming member.

2. The sound-activated light source system as claimed in claim 1, wherein the acoustoelectric transforming member is comprised of an electroactive polymer artificial muscle film.

3. The sound-activated light source system as claimed in claim 1, wherein the acoustoelectric transforming member comprises a plurality of layers each comprised of the electroactive polymer artificial muscle.

4. The sound-activated light source system as claimed in claim 3, wherein the acoustoelectric transforming member consists of 5 to 10 layers of the electroactive polymer artificial muscle.

5. The sound-activated light source system as claimed in claim 1, further comprising an acoustic receiver coupled to the electroactive polymer artificial muscle for facilitating the electroactive polymer artificial muscle to receive the acoustic signal.

6. The sound-activated light source system as claimed in claim 5, wherein the acoustic receiver is made of polyethylene terephathalate.

7. The sound-activated light source system as claimed in claim 6, wherein the acoustic receiver includes a polyethylene terephathalate film, the acoustoelectric transforming member includes an electroactive polymer artificial muscle film coupled to the polyethylene terephathalate film.

8. The sound-activated light source system as claimed in claim 7, wherein the electroactive polymer artificial muscle film includes a plurality of layers of electroactive polymer artificial muscle, each layer of the electroactive polymer artificial muscle is coupled to the polyethylene terephathalate film.

9. The sound-activated light source system as claimed in claim 6, wherein the acoustoelectric transforming member comprises two electroactive polymer artificial muscle films, the electroactive polymer artificial muscle films are respectively coupled to the acoustic receiver and the controlling circuit.

10. The sound-activated light source system as claimed in claim 1, wherein the light source device includes an array of monochrome light emitting members, and configured for emitting monochrome light with adjustable brightness by means of the controlling circuit.

11. The sound-activated light source system as claimed in claim 10, wherein the monochrome light emitting members comprises at least one emitting diode for emitting single color light.

12. The sound-activated light source system as claimed in claim 1, wherein the light source device includes an array of light emitting members for emitting light with variable colors by means of the controlling circuit.

13. A sound-activated light source system comprising:
a light emitting diode array; and
a sound-activated controlling device comprising an acoustoelectric transforming member and a controlling circuit, the acoustoelectric transforming member comprising electroactive polymer artificial muscle for converting an acoustic signal into an electrical signal, the controlling circuit being electrically coupled to the electroactive polymer artificial muscle and the acoustoelectric transforming member, and being configured for controlling at least one of brightness and color of light emitted from the light emitting diode array based on the electrical signal received from the acoustoelectric transforming member.

14. The sound-activated light source system as claimed in claim 13, wherein the acoustoelectric transforming member includes an electroactive polymer artificial muscle film.

15. The sound-activated light source system as claimed in claim 13, wherein the light emitting diode array comprises at least two light emitting diodes for emitting light with different colors.

16. The sound-activated light source system as claimed in claim 13, further comprising an acoustic receiver coupled to the electroactive polymer artificial muscle film for promoting the electroactive polymer artificial muscle film to receive the acoustic signal.

17. The sound-activated light source system as claimed in claim 13, wherein the acoustic receiver includes a polyethylene terephathalate film.

* * * * *